(12) United States Patent
Mendelson et al.

(10) Patent No.: US 12,278,755 B2
(45) Date of Patent: Apr. 15, 2025

(54) ROUTING WITH A FIXED MATCHINGS SWITCH

(71) Applicant: MELLANOX TECHNOLOGIES, LTD., Yokneam (IL)

(72) Inventors: Gal Mendelson, Adi (IL); Jose Yallouz, Kibutz Shaar Hamakim (IL)

(73) Assignee: Mellanox Technologies, LTD., Yokneam (IL)

( * ) Notice: Subject to any disclaimer, the term of this patent is extended or adjusted under 35 U.S.C. 154(b) by 49 days.

(21) Appl. No.: 17/108,269

(22) Filed: Dec. 1, 2020

(65) Prior Publication Data
US 2022/0174000 A1  Jun. 2, 2022

(51) Int. Cl.
*H04L 45/00* (2022.01)
*H04L 45/24* (2022.01)
*H04L 45/60* (2022.01)

(52) U.S. Cl.
CPC ............. *H04L 45/22* (2013.01); *H04L 45/24* (2013.01); *H04L 45/26* (2013.01); *H04L 45/38* (2013.01); *H04L 45/60* (2013.01)

(58) Field of Classification Search
CPC ......... H04L 45/22; H04L 45/24; H04L 45/26; H04L 45/38; H04L 45/60; H04L 41/0803; H04L 49/10
USPC ...................................................... 709/238
See application file for complete search history.

(56) References Cited

U.S. PATENT DOCUMENTS

| | | | | |
|---|---|---|---|---|
| 5,068,892 A * | 11/1991 | Livanos | .................. | H04M 3/36 379/112.01 |
| 7,002,960 B1 * | 2/2006 | Golan | .................. | H04L 47/781 370/395.32 |
| 10,231,036 B1 * | 3/2019 | Ben-Itzhak | .......... | G02B 6/3546 |
| 2011/0222506 A1 * | 9/2011 | Szymanksi | .......... | H04L 27/2601 370/335 |
| 2012/0008943 A1 | 1/2012 | Singla et al. | | |
| 2012/0008945 A1 * | 1/2012 | Singla | ................. | H04J 14/0204 398/45 |
| 2014/0153399 A1 * | 6/2014 | Song | ...................... | H04L 45/06 370/238 |
| 2015/0236945 A1 | 8/2015 | Michael et al. | | |

(Continued)

FOREIGN PATENT DOCUMENTS

| | | | | |
|---|---|---|---|---|
| CN | 107407777 | | 11/2017 | |
| CN | 108259387 | | 7/2018 | |
| EP | 2604000 B1 * | | 12/2016 | ......... H04L 12/4633 |

OTHER PUBLICATIONS

Mellette et al. "RotorNet: A Scalable, Low-complexity, Optical Datacenter," Proceedings of the Conference of the ACM Special Interest Group on Data Communication, SIGCOMM 17, Aug. 2017, pp. 267-280.

(Continued)

*Primary Examiner* — Michael Won
(74) *Attorney, Agent, or Firm* — Sheridan Ross P.C.

(57) ABSTRACT

A switch, communication system, and method are provided. In one example, a communication system is described that includes a plurality of communication nodes and a switch that interconnects and facilitates a transmission of packets between the plurality of communication nodes. The communication system may be configured such that the packets are transmitted between the plurality of communication nodes by draining a demand matrix.

22 Claims, 8 Drawing Sheets

(56) References Cited

U.S. PATENT DOCUMENTS

2016/0191370 A1\* 6/2016 Wood .................. H04L 41/0816
　　　　　　　　　　　　　　　　　　　　　　　　 370/238
2016/0316284 A1\* 10/2016 Javidi ................ H04Q 11/0005
2018/0048525 A1\* 2/2018 Karasaridis ............. H04L 69/40

OTHER PUBLICATIONS

Official Action with Machine Translation for China Patent Application No. 202111411933.6, dated Aug. 30, 2023, 22 pages.
Official Action with Machine Translation for China Patent Application No. 202111411933.6, dated Jan. 30, 2024, 5 pages.

\* cited by examiner

ROUTING WITH A FIXED MATCHINGS SWITCH

FIELD OF THE DISCLOSURE

The present disclosure is generally directed toward networking and, in particular, toward networking devices, switches, and methods of operating the same.

BACKGROUND

Switches and similar network devices represent a core component of many communication, security, and computing networks. Switches are often used to connect multiple devices, device types, networks, and network types.

Electrical and optical switches can be built to support all possible matchings between communication nodes. In the case of a switch connecting four communication nodes, the switch is configured to support nine different matchings. A switch of this type is sometimes referred to as a full crossbar switch.

The fixed matchings switch or rotor switch is a recently proposed switch design that differs from a full crossbar switch. The idea behind implementing a fixed matchings switch or rotor switch instead of a full crossbar switch is to sharply limit the number of matchings the switch is able to implement and instead of dynamically choosing which matchings to configure and when, the switch cycles through the small number of matchings in a fixed/predetermined order. An advantage of implementing a fixed matchings switch or rotor switch instead of a full crossbar switch is that switch reconfiguration times are greatly reduced. Fixed matchings switches or rotor switches also present an opportunity to scale to a larger number of ports than can be supported by a full crossbar switch. The fixed matchings, however, present a challenge: if the number of ports is large, then each pair of ports are directly connected for a very small fraction of time. This means that if packets are restricted to direct transmission (e.g., only being sent from their source communication node directly to their destination communication node), then some packets may have to wait for a very long time before being transmitted, thereby increasing latency and limiting bandwidth.

BRIEF SUMMARY

As mentioned above, an advantage of implementing a fixed matchings switch or rotor switch is that switch reconfiguration times can be greatly reduced and the switch can be scaled to support a larger number of ports than a full crossbar switch. However, enforcing direct packet transmission may result in a switch that increases latency and limits bandwidth. It is, therefore, desirable to configure a fixed matchings switch or rotor switch to enable multi-hop routing. In other words, a fixed matchings switch or rotor switch that successfully enables multi-hop routing may achieve the benefits of a reduced reconfiguration times and scalability without enduring the increased latency or reduced bandwidth problems.

A switch that implements multi-hop routing may enable a packet to be transmitted from a source communication node to a destination communication node through an intermediate communication node. For example, a packet travelling from a first communication node to a second communication node may be allowed to first be transmitted from the first communication node to a third communication node before being transmitted from the third communication node to the second communication node. Choosing relay or intermediate communication nodes wisely can substantially improve performance of a fixed matchings switch or rotor switch. The price of multi-hop routing is increasing the load on relay or intermediate communication nodes and their links, possibly hurting their ability to transmit and receive their own packets, again increasing latency and degrading bandwidth.

Embodiments of the present disclosure aim to solve the above-noted shortcomings and other issues by implementing an improved routing approach. The routing approach depicted and described herein may be applied to a fixed matchings switch, a rotor switch, or any other suitable type of switch known or yet to be developed. As will be described in further detail herein, a switch that implements the routing approaches described herein may correspond to an optical routing switch (e.g., an Optical Circuit Switch (OCS)), an electrical switch, a combined electro-optical switch, or the like.

The routing approach provided herein may utilize a demand matrix and make routing decisions in a way that drains the demand matrix in a limited or minimal number of matchings. Given a demand matrix (e.g., a matrix that represents or describes the number of packets each source communication node aims to send to each destination communication node), the goal is to enable intelligent routing decisions such that the time it takes for all packets to reach their destination communication node is minimized.

The routing approach described herein aggressively decreases upper and lower bounds on the demand matrix draining time. Much like seeping water, packets find the way to their destination through least resistance paths. The routing approach proposed herein is simple and has a low computational complexity. In some embodiments, the routing approach may allow each communication node to make uncoordinated, local routing decisions based on information from the communication node that it is currently connected to and a small amount of global information. Thus, the routing approach of the present disclosure can be implemented in a distributed fashion, alleviating the overhead of centralized control. It should be appreciated, however, that centralized control (e.g., at a switch) may also be implemented without departing from the scope of the present disclosure.

The routing approach of the present disclosure may be highly useful for several fundamental traffic patterns such as uniform, many-to-one, and one-to-many. The draining approach has been proven to perform extremely well, such that under it, the demand matrix draining is accomplished almost at the lower bound for every traffic pattern.

There can be multiple approaches to making a decision on packet routing. Two examples of packet routing approaches include dynamic packet routing and demand matrix draining. If dynamic packet routing is implemented, routing decisions may be made based on the current state of packets waiting to be transmitted. If demand matrix draining is implemented, then demand information may be gathered from the communication nodes to build a demand matrix. Routing decisions are then made for packets in an attempt to drain the demand matrix. Previously available dynamic packet routing approaches include Valiant Load Balancing (VLB) and RotorLB. Both VLB and RotorLB present multi-hop routing approaches in which relay communication nodes are preselected without regard to a current state of the switch. Indeed, under both VLB and RotorLB, relay communication nodes are randomly selected, significantly saturating the switch with needless and inefficient packet traffic. In comparison, the routing approach of the present disclosure enables an intelligent selection of relay or intermediate communication nodes based on a current state of the switch. The selection of relay or intermediate communication nodes may be reserved for conditions where direct packet transmission between a source communication node and destination communication node is not possible based on the current configuration of the switch (e.g., based on a current matching configuration).

In an illustrative example, a switch is disclosed that includes: a plurality of ports, each port in the plurality of ports being configured to connect with a communication node; switching hardware configured to selectively interconnect the plurality of ports thereby enabling communications between the plurality of ports; and a switching engine that controls a transmission of packets across the switching hardware by draining a demand matrix.

In another example, a communication system is disclosed that includes: a plurality of communication nodes; and a switch that interconnects and facilitates a transmission of packets between the plurality of communication nodes, where the packets are transmitted between the plurality of communication nodes by draining a demand matrix.

In yet another example, a method of routing packets is disclosed that includes: connecting a plurality of communication nodes to a switch; selectively enabling the plurality of communication nodes to communicate in pairs via the switch at different matching intervals; defining a demand matrix; and controlling a transmission of packets between the communication nodes by draining the demand matrix.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1A:
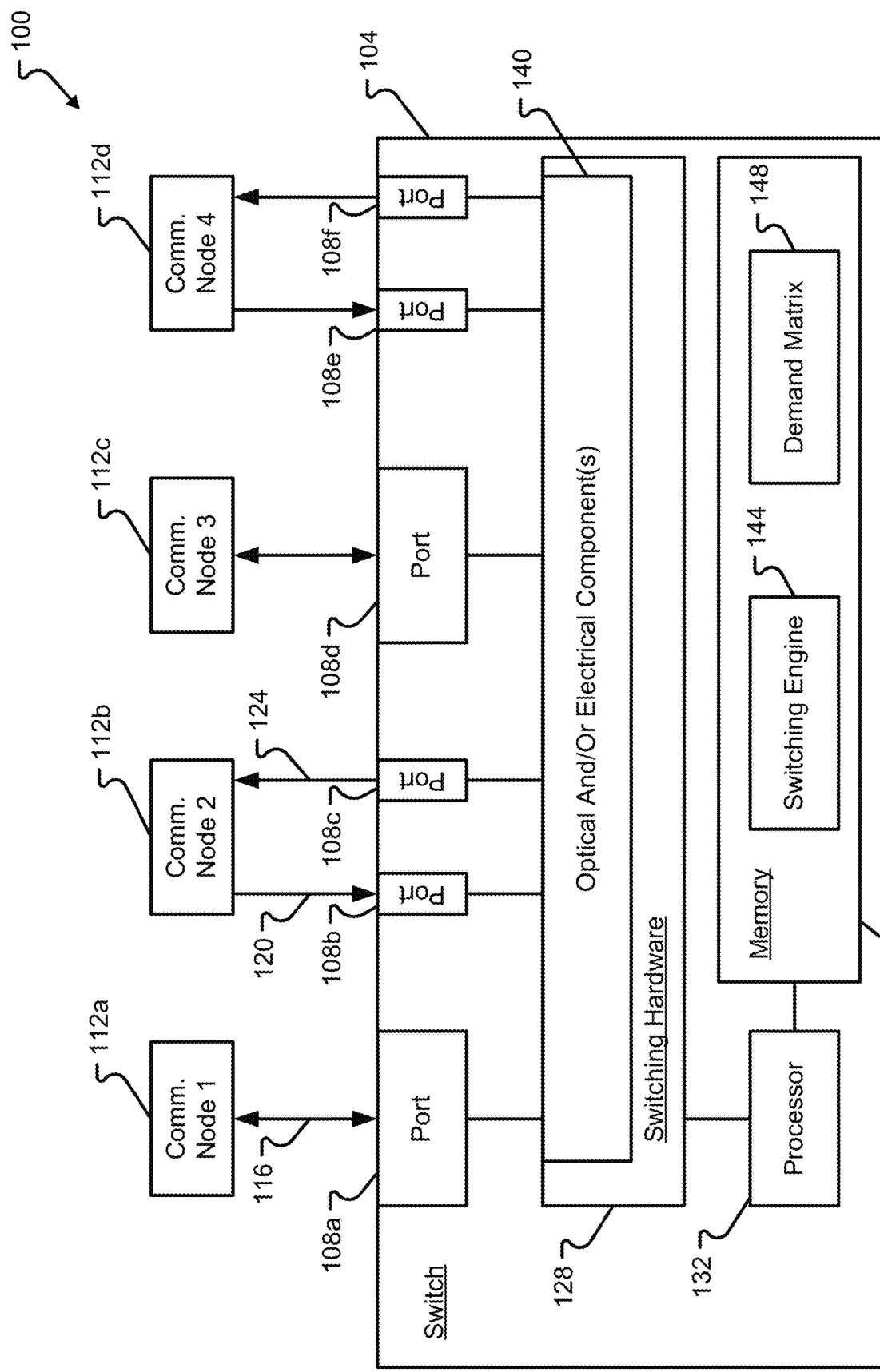
FIG. 1A is a block diagram depicting a first illustrative configuration of a communication system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means: A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-7, various systems and methods for routing packets between communication nodes will be described. The concepts of packet routing depicted and described herein can be applied to the routing of information from one computing device to another. The term packet as used herein should be construed to mean any suitable discrete amount of digitized information. The information being routed may be in the form of a single packet or multiple packets without departing from the scope of the present disclosure. Furthermore, certain embodiments will be described in connection with a system that is configured to make centralized routing decisions whereas other embodiments will be described in connection with a system that is configured to make distributed and possibly uncoordinated routing decisions. It should be appreciated that the features and functions of a centralized architecture may be applied or used in a distributed architecture or vice versa.

Figure 1B:
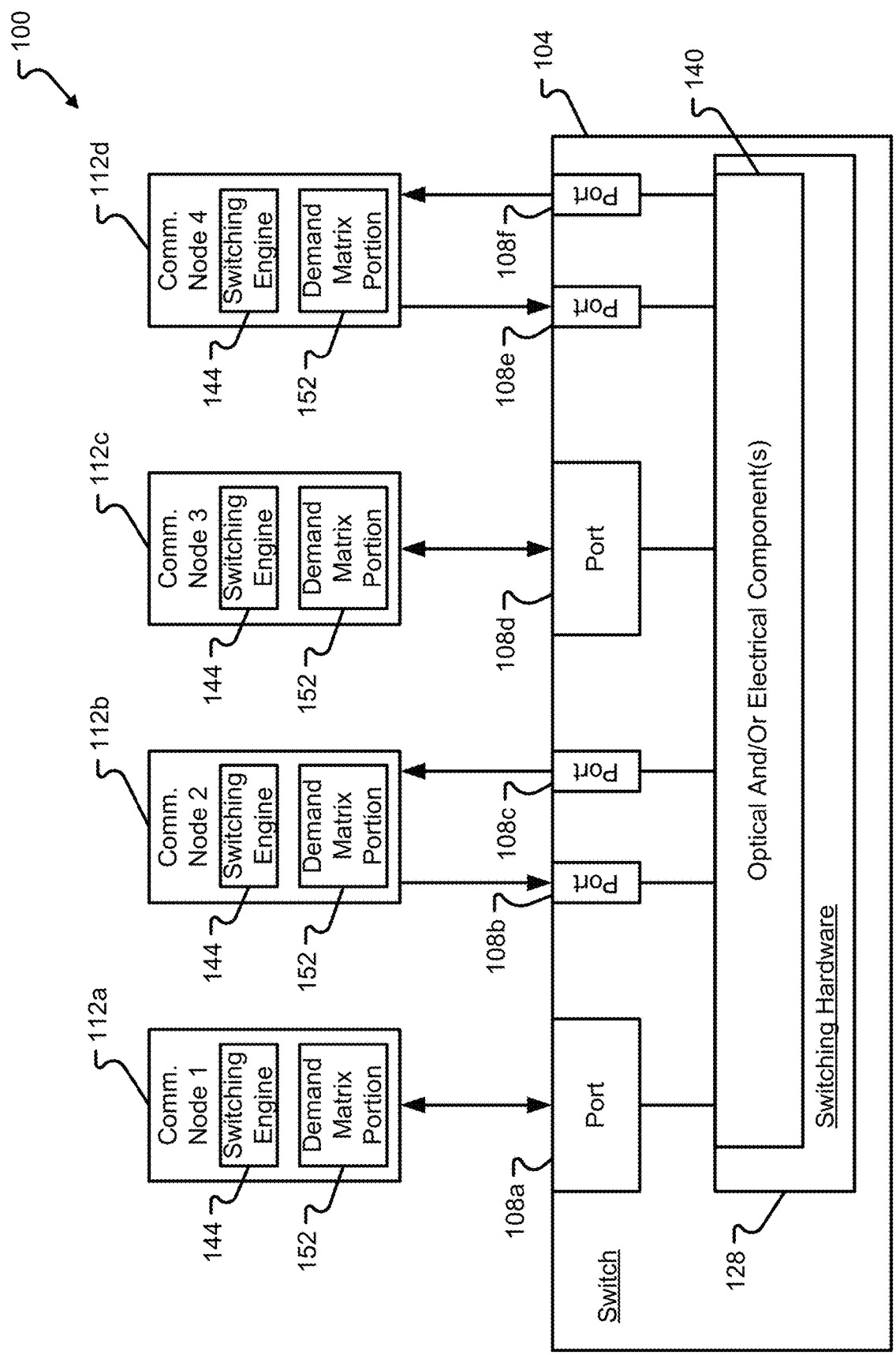
FIG. 1B is a block diagram depicting a second illustrative configuration of a communication system in accordance with at least some embodiments of the present disclosure.

Referring initially to FIG. 1A, a first possible configuration of a communication system 100 will be described in accordance with at least some embodiments of the present disclosure. It should be appreciated that the components described with reference to FIG. 1A may or may not also be used in a communication system 100 as shown in FIG. 1B.

In the configuration of FIG. 1A, a communication system 100 is shown to include a switch 104 connecting one or more communication nodes 112 via a number of communication ports 108. The illustrated switch 104 is shown to be connected with four communication nodes 112a-d via a plurality of communication ports 108. The illustration of four communication nodes 112a-d is for ease of discussion and should not be construed as limiting embodiments of the present disclosure. Specifically, a switch 104 may be configured to connect any suitable number of communication nodes 112 and the switch 104 may include a number of ports 108 to facilitate such connections. Even more specifically, a switch 104 may be configured to connect a greater or lesser number of communication nodes 112 than are shown in FIG. 1A. Moreover, embodiments of the present disclosure contemplate that not all ports 108 of a switch 104 need to be connected with a communication node 112. For instance, one or more ports 108 of a switch 104 may be left unconnected (e.g., open) and may not have any particular networking cable 116 plugged into the port 108.

The communication nodes 112a-d may be the same type of devices or different types of devices. As a non-limiting example, some or all of the communication nodes 112a-d may correspond to a Top-of-Rack (TOR) switch. Alternatively or additionally, one or more of the communication nodes 112a-d may correspond to a device other than a TOR switch. The communication nodes 112a-d do not necessarily need to communicate using the same communication protocol because the switch 104 may include components to facilitate protocol conversion and/or a communication node 112 may be connected to the switch 104 via a pluggable network adapter.

While the communication nodes 112a-d may correspond to a TOR switch, one or more of the communication nodes 112a-d may be considered host devices, servers, network appliances, data storage devices, or combinations thereof. A communication node 112, in some embodiments, may correspond to one or more of a Personal Computer (PC), a laptop, a tablet, a smartphone, a server, a collection of servers, or the like. It should be appreciated that a communication node 112 may be referred to as a host, which may include a network host, an Ethernet host, an InfiniBand (IB) host, etc. As another specific but non-limiting example, one or more of the communication nodes 112 may correspond to a server offering information resources, services and/or applications to user devices, client devices, or other hosts in the communication system 100. It should be appreciated that the communication nodes 112 may be assigned at least one network address (e.g., an IP address) and the format of the network address assigned thereto may depend upon the nature of the network to which the communication node 112 is connected.

FIG. 1A illustrates that one or multiple networking cables may be used to connect a communication node 112 to the switch 104. In some embodiments, a communication node 112 (e.g., the first communication node 112a and third communication node 112c) may connect to a single port 108 (e.g., the first port 108a and fourth port 108d) via a bidirectional communication link 116. The bidirectional communication link 116 may be established over a networking cable and may utilize any suitable communication protocol known or yet to be developed for the transmission of data packets.

A communication node 112 (e.g., the second communication node 112b and fourth communication node 112d) may alternatively, or additionally, be connected with the switch 104 via multiple ports 108 (e.g., the second port 108b, third port 108c, fifth port 108e, and sixth port 108f). In such a configuration, one of the ports 108 may be used to carry packets from the switch 104 to the communication node 112 whereas the other of the ports 108 may be used to carry packets from the communication node 112 to the switch 104. As an example, the second port 108b is shown to receive packets from the second communication node 112b via a data uplink 120 whereas the third port 108c is shown to carry packets from the switch 104 to the second communication node 112b via a data downlink 124. In this configuration, separate networking cables may be used for the data uplink 120 and the data downlink 124.

The switch 104 may correspond to an optical switch and/or electrical switch. In some embodiments, the switch 104 may include switching hardware 128 that is configurable to selectively interconnect the plurality of ports 108a-f, thereby enabling communications between the plurality of ports 108a-f, which enables communications between the communication nodes 112a-d. In some embodiments, the switching hardware 128 may be configured to selectively enable the plurality of communication nodes 112a-d to communicate in pairs based on a particular configuration of the switching hardware 128. Specifically, the switching hardware 128 may include optical and/or electrical component(s) 140 that are switchable between different matching configurations. In some embodiments, the optical and/or electrical components 140 may be limited in the number of matching configurations it can accommodate, meaning that a port 108 may not necessarily be connected with/matched with every other port 108 at a particular instance in time.

In some embodiments, the switch 104 may correspond to an optical circuit switch, which means that the optical and/or electrical components 140 may include a number of optical and/or opto-electronic components that switch optical signals from one channel to another. The optical and/or electrical components 140 may be configured to provide an optical switching fabric, in some embodiments. As an example, the optical and/or electrical component(s) 140 may be configured to operate by mechanically shifting or moving an optical fiber to drive one or more alternative fibers. Alternatively or additionally, the optical and/or electrical component(s) 140 may include components that facilitate switching between different port matchings by imparting electro-optic effects, magneto-optic effects, or the like. For instance, micromirrors, piezoelectric beam steering mechanisms, liquid crystals, filters, and the like may be provided in the optical and/or electrical components 140 to facilitate switching between different matching configurations of optical channels.

In some embodiments, the switch 104 may correspond to an electrical switch, which means that the optical and/or electrical components 140 may include a number of electrical components or traditional electronic circuitry that is configured to manage packet flows and packet transmissions. Accordingly, the optical and/or electrical components 140 may alternatively or additionally include one or more Integrated Circuit (IC) chips, microprocessors, circuit boards, Data Processing Units (DPUs), simple analog circuit components (e.g., resistors, capacitors, inductors, etc.), digital circuit components (e.g., transistors, logic gates, etc.), memory devices, Field Programmable Gate Arrays (FPGAs), Application Specific Integrated Circuits (ASICs), combinations thereof, and the like.

At a given point in time (t=0, 1, 2, ...) (e.g., at different matching intervals), the switch 104 may be configured to implement a matching between the communication nodes 112*a*-*d*. In other words, the switch 104 may dynamically reconfigure the optical and/or electrical component(s) 140 of the switching hardware 128 to define, for a specific matching interval, which ports 108 are connected to one another. As an example, the switching hardware 128 may be configured to connect input ports 108 with output ports 108 in pairs so that each input port 108 for a communication node 112 is connected to exactly one other communication node's 112 output port 108. For example, where n=4, a matching of communication nodes 112 could be: node 1→node 2, node 2→node 1, node 3→node 4, node 4→node 3. In this case, the first communication node 112*a* can send a packet via an uplink 120 to the switch 104 input port 108 and the switch 104 will forward the packet to the second communication node 112*b* via the output port 108 and the second communication node's 112*b* downlink 124. The same goes for a packet from the fourth communication node 112*d* that wants to travel to the third communication node 112*c*. However, during the above-mentioned matching interval, it may not be possible to directly send a packet from the first communication node 112*a* to the third communication node 112*c*. Such a direct packet transmission would have been possible if the matching configuration was, for example, node 1→node 3, node 2→node 4, node 3→node 2, node 4→node 1.

Figure 2:
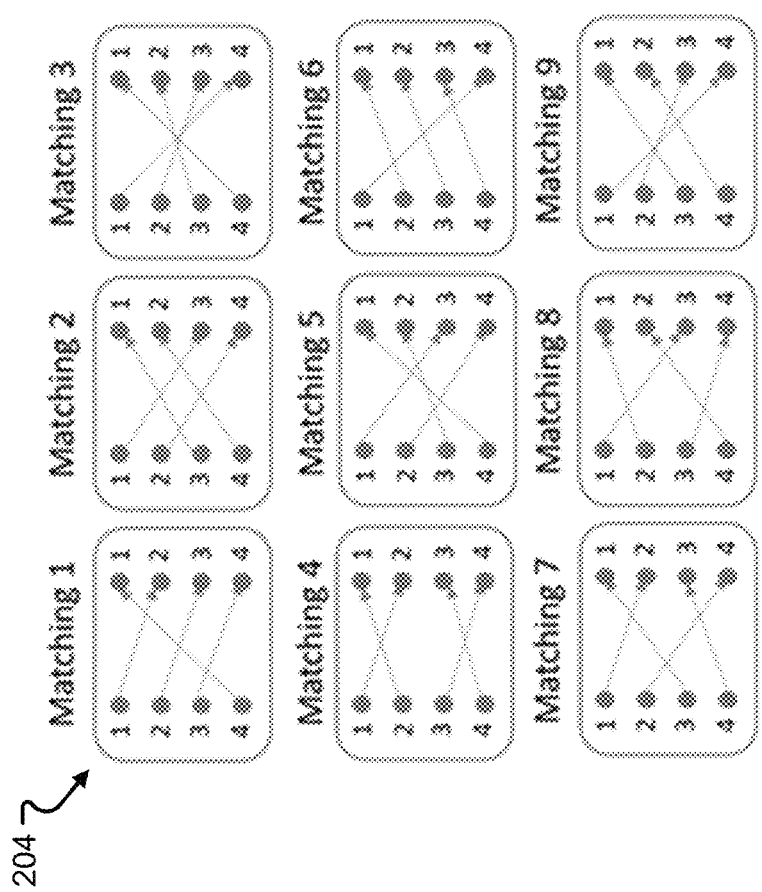
FIG. 2 illustrates possible matchings between four communication nodes.

In total, the number of possible permutations of matchings is !, while n−1 matchings are required to cover all communications pairs. A convenient way of illustrating the different possible matchings 204 is depicted in FIG. 2. Each possible matching 204 illustrated in FIG. 2 shows how communication nodes 112*a*-*d* can be connected in pairs for any particular matching configuration.

Electrical and optical switches 104 may be built so they are able to configure all possible matchings 204. In the case of four nodes as depicted FIG. 2, this translates into nine matchings 204. A switch 104 that supports all possible matchings 204 may be referred to as a full crossbar switch. Then, different routing algorithms are used to decide which matchings to implement and when.

In certain types of switches (e.g., OCSs), being able to configure all possible matchings 204 comes at a price: (1) the time it takes to change the matching (referred to as the "re-configuration time") is long. During this time no packets can be transmitted which limits the bandwidth and increases latency; and (2) it is challenging to build such switches 104 with a large number of ports at a reasonable price.

Figure 3:
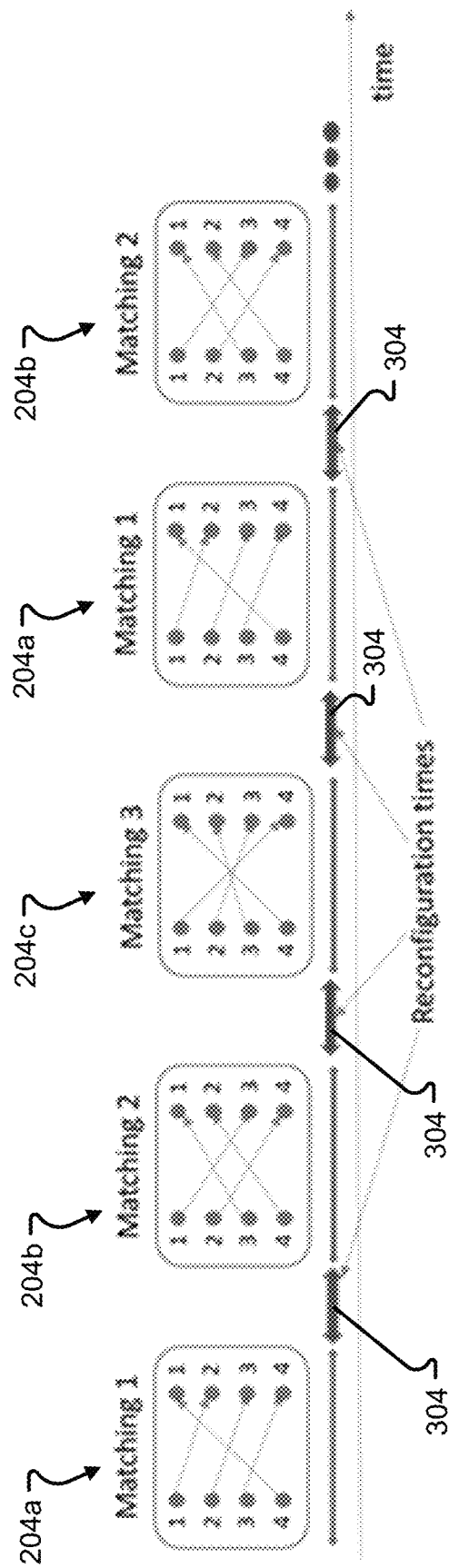
FIG. 3 illustrates various configurations of switching hardware at different matching intervals in accordance with at least some embodiments of the present disclosure.

An alternative switch 104 design may be considered to address the shortcomings noted above. In some embodiments, the switch 104 may correspond to a fixed matchings switch or rotor switch that is configured to only implement some of the possible matchings 204 depicted in FIG. 2. An idea behind utilizing a switch 104 of this type is to limit the number of matchings 204 the switch 104 is able to implement, and instead of dynamically choosing which matchings to configure and when, enable the switch 104 to cycle through the small number of matchings 204 in a fixed predetermined order where each matching 204 is implemented for the same amount of time. Also, in each cycle, every pair of communication nodes 112 are connected exactly once. FIG. 3 illustrates an example of a switch 104 connected with four communication nodes 112*a*-*d* where the switch 104 cycles through the first three matchings 204 depicted in FIG. 2.

As shown in FIG. 3, the switch 104 may cycle through three matchings 204, which include a first matching 204*a*, a second matching 204*b*, and a third matching 204*c*. The optical and/or electrical components 140 may be configured differently from one matching 204 to the next, thereby enabling the different matchings 204 between ports 108. In some embodiments, each of the three matchings 204*a*, 204*b*, 204*c* may be configured to be held for approximately or exactly the same amount of time, which may be referred to as a matching interval. Each time the switch 104 reconfigures the switching hardware 128 to implement a new matching 204, the switch 104 enters into a reconfiguration interval 304, during which time no packets can be transmitted between communication nodes 112. After the reconfiguration interval 304, the switching hardware 128 is in a new matching 204 for a new matching interval. During each matching interval, packets can travel between communication nodes 112*a*-*d* based on the current matching 204. As will be discussed in further detail herein, packets may travel directly from a source communication node 112 to a destination communication node 112 or travel through an intermediate communication node 112 on their way to the destination communication node 112 (referred to as multi-hop routing).

An advantage of utilizing the switch 104 as a fixed matchings switch or rotor switch is that re-configuration times are greatly reduced and the switch 104 is able to scale to a large number of ports 108. But, the fixed matchings present a challenge: if the number of ports 108 is large, then each pair of communication nodes 108 is directly connected for a very small fraction of the time. This means that if we restrict packets to only move directly from source to their destination, they will have to wait a very long period of time, thus increasing latency and limiting bandwidth. Therefore, embodiments of the present disclosure contemplate operating a switch 104 using a switching engine 144 and demand matrix 148 for purposes of making routing decisions. In some embodiments, the switching engine 144 may implement a multi-hop routing process, where relay or intermediate communication nodes 112 are selected if direct packet transmission is not possible, and where the relay or intermediate communication nodes 112 are selected with reference to the demand matrix 148.

In some embodiments, the communication nodes 112*a*-*d* generate packets as a function of time to be sent to one another via the switch 104. There are two possible approaches of how to make a decision on packet routing: dynamic packet routing and demand matrix 148 draining. If dynamic packet routing is implemented, at each point in time, the switch 104 makes routing decisions based on the current state of packets waiting to be transmitted in all of its input ports 108. If demand matrix draining is implemented, the switching engine 144 may gather demand information from the communication nodes 112 (e.g., information describing how many packets each communication node 112 wants to transmit and where), build a demand matrix 148 based on the gathered information, then route packets to drain the demand matrix 148 built with the information gathered from the communication nodes 112. Meanwhile, a new demand matrix 148 may be constructed to be used in the same way, but only after the current demand matrix 148 is drained.

In some embodiments, the switch 104 may include a processor 132 that executes the switching engine 144, which is stored in memory 136. The demand matrix 148 (or demand matrices) may also be stored in memory 136 and may be referenced by the processor 132 when executing the switching engine 144.

In some embodiments, as shown in FIG. 1B, the logic of the switching engine 144 may be distributed among the communication nodes 112a-d. In this way, routing decisions can be made in a distributed fashion and the routing decisions do not need to rely on a single switching engine 144 provided by the switch 104. In the distributed logic configuration of FIG. 1B, each communication node 112a-d may have access to only a demand matrix portion 152. A demand matrix portion 152 may correspond to one or more rows of a demand matrix 148, one or more columns of a demand matrix 148, or combinations thereof. Collectively, each demand matrix portion 152 provided at each communication node 112a-d may be combined to result in the demand matrix 148. As will be described herein, because routing decisions are being made with reference to the demand matrix 148 (or a demand matrix portion 152) with an effort to drain the demand matrix 148 in a minimal number of matchings, each communication node 112a-d can make uncoordinated, local routing decisions based on information from the other communication node 112 that it is currently connected to and a small amount of global information (e.g., a knowledge of current and upcoming matchings 204). Thus, while certain embodiments of the present disclosure will be described with reference to a centralized switching engine 144, it should be appreciated that the packet routing decisions can be made in a distributed fashion, thereby alleviating the overhead of centralized control.

In some embodiments, the routing decisions made by the switching engine 144 may be made with reference to the demand matrix 148 (or the demand matrix portion 152). For example, the switching engine 144, whether provided in the switch 104 or the communication nodes 112a-d, may be configured to make routing decisions for packets travelling between communication nodes 112 in such a way that the demand matrix 148 is drained in a minimal number of matchings 204 or matching intervals. Although not depicted, a communication node 112 may include a processor 132 and memory 136 as shown in the switch 104 of FIG. 1A. The communication nodes 112a-d are not shown with a processor 132 and memory 136 for ease of discussion and clarity of the drawings, but this should not be construed as limiting embodiments of the present disclosure.

The processor 132 (whether provided in the switch 104 or a communication node 112) may be configured to execute the instructions (e.g., the switching engine 144) stored in memory 136. As some non-limiting examples, the processor 132 may correspond to a microprocessor, an IC chip, a Central Processing Unit (CPU), a Graphics Processing Unit (GPU), a DPU, or the like. The memory 136 may correspond to any appropriate type of memory device or collection of memory devices configured to store instructions. Non-limiting examples of suitable memory devices that may be used for memory 136 include Flash memory, Random Access Memory (RAM), Read Only Memory (ROM), variants thereof, combinations thereof, or the like. In some embodiments, the memory 136 and processor 132 may be integrated into a common device (e.g., a microprocessor may include integrated memory).

Figure 4:
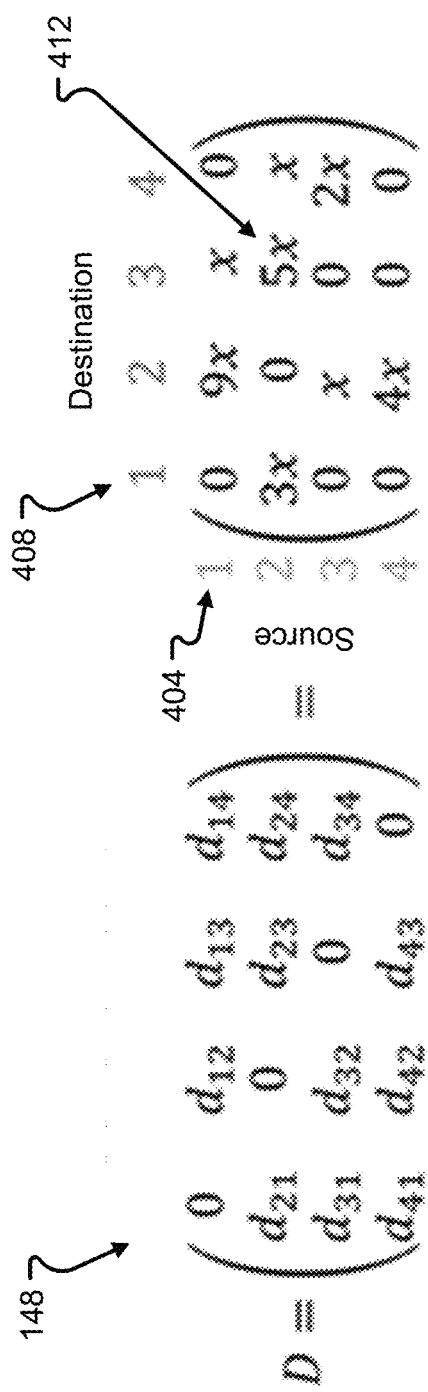
FIG. 4 illustrates an example demand matrix in accordance with embodiments of the present disclosure.
Figure 5:
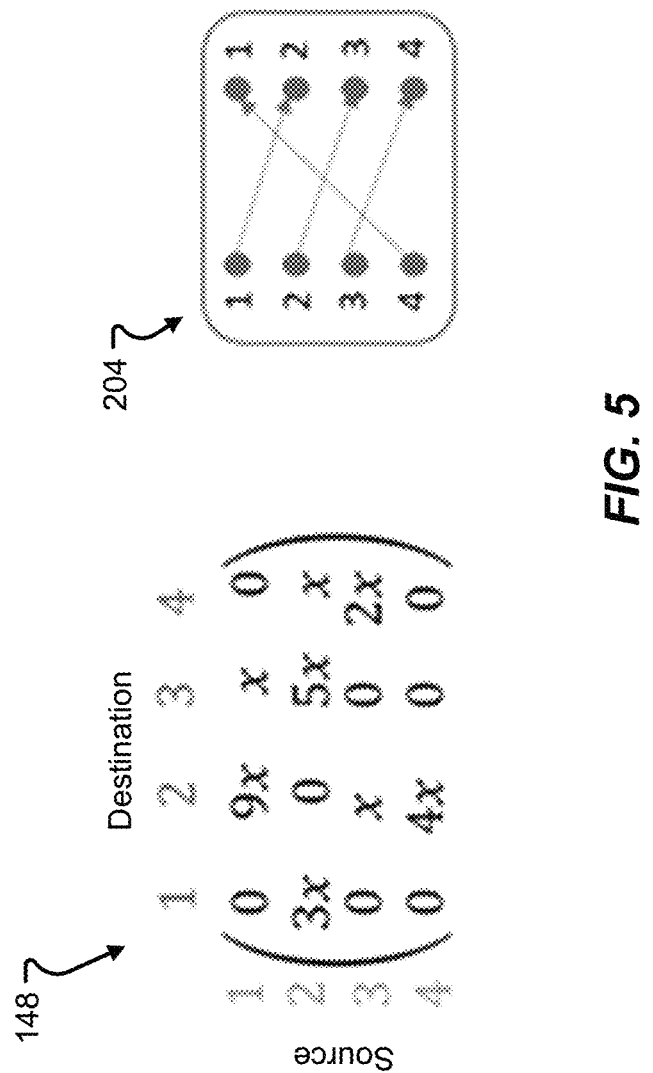
FIG. 5 illustrates an example demand matrix and matching for four communication nodes in accordance with at least some embodiments of the present disclosure.
Figure 6:
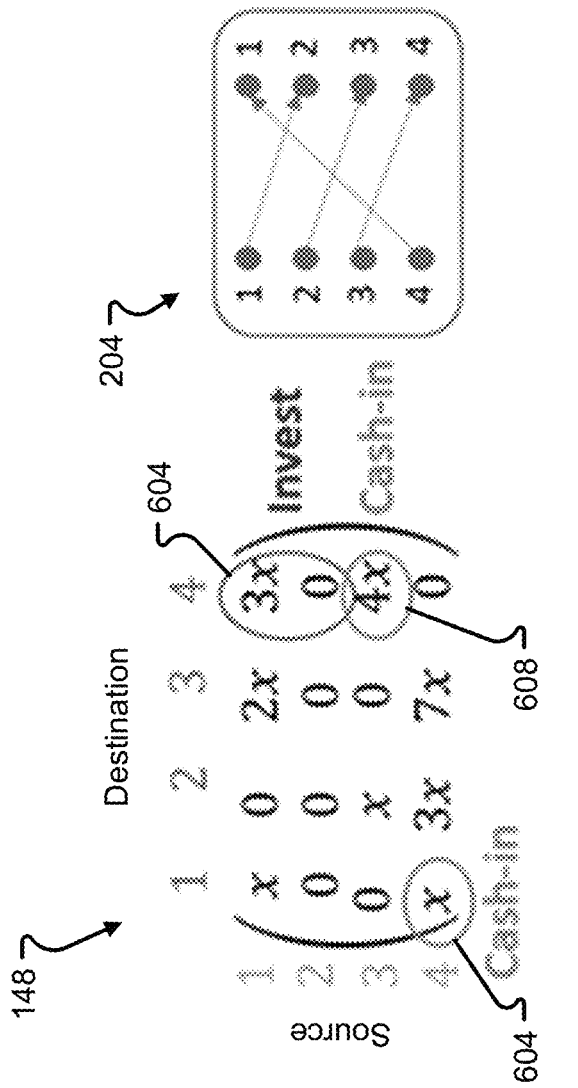
FIG. 6 illustrates an analysis of a demand matrix performed by a switching engine at a matching interval in accordance with at least some embodiments of the present disclosure.

With reference now to FIGS. 4-6, additional details of a demand matrix 148 will be described in accordance with at least some embodiments of the present disclosure. While depicted and described as a single demand matrix 148, it should be appreciated that the discussions of the demand matrix 148 may be applied to the use of demand matrix portions 152 at the communication nodes 112.

Embodiments of the present disclosure contemplate operating the switching engine 144 such that a multi-hop routing approach is implemented for the demand matrix 148 draining case. VLB and RotorLB may be adopted or implemented by the switching engine 144 as well, but, as will be described in further detail herein, both VLB and RotorLB perform less efficiently than the routing process described herein due to the random selection of relay or intermediate communication nodes 112.

In some embodiments, the switching engine 144 may implement a so-called "Seep" approach because much like seeping water, packets find their way to their destination via the path of least resistance.

To understand the operation of the switching engine 144 (whether implemented at the switch 104 or at the communication nodes 112a-d), it is useful to first understand the construction of the demand matrix 148. As shown in FIG. 4, the demand marix 148 may include a row 404 and column 408 for each communication node 112 connected to the switch's 104 plurality of ports 108. The demand matrix 148 may also include a number of parameter values 412, where each parameter value 412 in the demand matrix 148 identifies a number of packets to be routed from a source communication node 112 to a destination communication node 112. The switching engine 144 may be configured to control the transmission of packets through the switching hardware 128 by draining the demand matrix 148 in a minimal number of matchings 204.

In some embodiments, the demand matrix 148 may correspond to an n×n matrix $D=(d_{ij})$, where the element in row i and column j is $d_{ij}$ and corresponds to the number of packets communication node i wishes to transmit to communication node j. It may be assumed that at each time slot (e.g., during each matching interval) each communication node 112 can transmit at most one packet and that each matching 204 is configured for x time slots. Thus, during a matching 204, matched communication nodes 112 can transmit at most x packets to one another.

It can also be assumed that the demand is a multiple of x (e.g. 7x). The case where this does not hold and there is some remainder is handled by first draining the demand matrix 148 without the remainder and then draining the remainder. The approach used to drain the remainder may be the same as the approach used to drain the demand matrix 148, hence a discussion of the approach used for draining the remainder is omitted.

The illustrative demand matrix 148 depicted in FIG. 4 is for the example of a switch 104 that is connected with four communication nodes 112a-d. As discussed above, the switch 104 may be configured to connect with a greater or lesser number of communication nodes 112, in which case the construction of the demand matrix 148 may be modified accordingly.

In FIG. 4, $d_{12}$=9x, meaning the first communication node 112a wants to send 9x packets to the second communication node 112b. The diagonal of the demand matrix 148 contains only zeros because communication nodes 112 do not send packets to themselves.

As an example, suppose there are n nodes connected via a switch 104 and a given demand matrix 148. Further suppose that each matching 204 in the fixed cycle of the switch 104 is configured for x time slots, and the reconfiguration time is y time slots. Still further suppose that at each time slot, at most a single packet can be transmitted from every source communication node 112 to the communication node that it is currently connected to. A goal of the switching engine 144 is to route packets such that the demand matrix 148 is completely drained in the minimal number of matchings.

During each matching 204, every source communication node i, matched to communication node j, implements logic of the switching engine 144 where inputs include:
1. Row i of the current demand matrix 148 (how many packets the source node i must send to all other nodes)
2. Row j of the current demand matrix 148 (how many packets the matched node j must send to all other nodes)

to the third communication node 112c (e.g., multi-hop routing). The result would be decreasing $d_{13}$ from x to 0, and increasing $d_{23}$ from 5x to 6x.

Based on the example above, it can be seen that direct transmission reduces the number of overall packets in the demand matrix 148, while multi-hop routing only changes how packets are distributed within the demand matrix 148. Based on this observation, the switching engine 144 may be configured to implement direct transmission, if possible, then, if direct transmission is not possible for a current matching 204, select a relay or intermediate communication node 112 with reference to the demand matrix 148 and with the aim of draining the demand matrix 148 in a minimal number of matchings 204.

With reference now to FIG. 6 and the pseudocode provided below, additional capabilities of the switching engine 144 will be described in accordance with at least some embodiments of the present disclosure. Specifically, the switching engine 144 may be configured to first attempt direct packet transmission from communication node i to communication node j during a current matching 204, which may be referred to as a "cash-in" 604 operation. If such an operation is not possible for a particular communication node 112 during the current matching 204, then the switching engine 144 may be configured to attempt multi-hop routing, which may be referred to as an "invest" 608 operation. Consider the following pseudocode for purposes of explanation and without intending to limit embodiments of the present disclosure:

Input: (i, j, $row_i$, $row_j$, ml)
Output: element of $row_i$ from which to send x packets to j

```
 1:  if CASHIN(i, j, row_i, row_j) then
 2;     return j                              ▷ send x packets directly from i to j
 3:  if j ∉ ml then                           ▷ j is not maximally loaded node
 4:     return INVEST(i, j, row_i, row_j)     ▷ try to invest
 5:  return                                   ▷ Cash~in and invest are not possible
 6:
 7:  function CASHIN(i, j, row_i, row_j)      ▷ check direct transmission
 8:     if row_i[j] > 0 then
 9:        return TRUE
10:     return FALSE
11:
12:  function INVEST(i, j, row_i, row_j)
13:     options ← {k: row_i[k] > x, row_j[k] = 0}   ▷ possible invests
14:     return argmax {row_i[k] : k ∈ options}      ▷ choose max element
15:
```

3. The identity of the current most loaded communication nodes, denoted by ml (the nodes whose rows in the demand matrix contain the maximum amount of packets to send).

Outputs of the switching engine 144 include a decision on which packets communication node i sends to communication node j during the current matching 204. For example, in the matching 204 depicted in FIG. 5, the first communication node 112a can possibly send x of the 9x packets destined to the second communication node 112b. This will be a direct transmission from a source communication node 112 to a destination communication node 112 (e.g., the transmission of the packet occurs with no relays or intermediate communication nodes). The result of implementing this direct transmission would be decreasing $d_{12}$ from 9x to 8x. Alternatively, the first communication node 112a can send to the second communication node 112b the x packets destined to the third communication node 112c ($d_{13}$). If the later approach is selected, then the second communication node 112b will serve as a relay for these packets travelling The switching engine 144, for each matching interval, may first attempt to execute a cash-in operation 604 (e.g., a direct transmission of a packet from a source communication node 112 to a destination communication node 112). During the cash-in operation 604, the switching engine 144 may first check if direct transmission from i to j is possible. If so, the output or decision of the switching engine 144 is to send x packets destined to node j to node j.

If the cash-in operation 604 does not result in the transmission of x packets destined to node j to node j, then the switching engine 144 may move into an invest operation 608 (e.g., a consideration of multi-hop routing). During the invest operation 608, the switching engine 144 will determine whether it is possible to send x packets destined to a third node k from node i to node j so that node j serves as a relay or intermediate node. In some embodiments, this decision to select node j as the relay node may be made when the following conditions are fulfilled:
  Invest condition 1: the "max condition": Node j is not one of the most loaded nodes, (e.g., j∉ml).

Invest condition 2: Node i has more than x packets destined to reach node k, (e.g., $d_{ik}>x$).

Invest condition 3: Node j has no packets of its own waiting to reach node k, (e.g., $d_{jk}=0$).

Invest condition 1 recognizes that the most loaded nodes highly influence the demand matrix 148 draining time. The max condition may be imposed so that the most loaded nodes will not receive an extra load, which interferes with the transmission of their own packets.

Invest condition 2 may be imposed because if $d_{ik}=x$ and these packets are sent to node j, the result is $d_{ik}=0$ and $d_{jk}=x$ (since, by condition 3, $d_{jk}=0$ before the transmission). This reaches a similar situation to the one started with, resulting in little or no benefit.

Invest condition 3 captures the idea of the invest operation 608. The logic is as follows: a conclusion that can be drawn is that the cash-in operation 604 is the best option to give priority to in order to reduce the draining time for the demand matrix 148. However, once a matrix element has a parameter value 412 of zero, there are no more packets of that type to send directly. A benefit of the investing operation 608 is to keep feeding packets to these matrix elements so additional packets are queued to transmit directly whenever the corresponding matching 204 is configured. Thus, once node i drains its own traffic destined for node j, node i can start serving as relay for all other nodes with traffic destined for node j. In other words, as communication nodes 112 finish transmitting their own packets, they create least resistance paths for other communication nodes to use as a relay or intermediate communication node. The switching engine 144 may be configured to cause packets to eventually seep via these paths of least resistance to their destination communication node 112.

There may be more than one possible invest operation 608 that meets the three conditions described above. In such a situation, the switching engine 144 may chooses to invest from the maximal element in row for which investing is possible. Prioritizing the maximal elements can further speed up the draining procedure.

Embodiments of the present disclosure enable the switching engine 144 to decrease the upper and lower bounds of the demand matrix 148 until the demand matrix 148 is completely drained.

Given a demand matrix D, let T denote the number of matchings 204 needed to drain the matrix. Let:

$$LB = \max\{\operatorname{sum}(row_1), \ldots, \operatorname{sum}(row_n), \operatorname{sum}(column_1), \ldots, \operatorname{sum}(column_n)\}$$

And $$UB = (n-1) \times \max_{i,j}\{d_{ij}\}$$

Then $$LB \leq T \leq UB$$

The Lower Bound (LB) on the draining time can be derived by simply taking the maximal sum of rows or columns of the matrix. The result means that no algorithm can do better than LB matchings 204. The closer an algorithm is to this lower bound, the better. Embodiments of the present disclosure provide a switching engine 144 that can finish the draining of the demand matrix 148 very close to LB every time and for all traffic patterns.

The Upper Bound (UB) may be derived by taking the maximal element of the matrix and multiplying it by the number of nodes n minus 1. This is the number of matchings 204 it will take to drain the matrix with no multi-hop routing.

Again, the switching engine 144 may be configured to decrease these upper and lower bounds until the demand matrix 148 is drained. In some embodiments, the switching engine 144 may prefer direct transmission because direct transmission reduces the sums of both rows and columns and therefore may reduce the lower bound. The switching engine 144 may also prioritize maximal elements in the invest operation to attempt to decrease the maximal elements in the matrix and reducing the upper bound. The max condition attempts to ensure that packets are not invested into a row with the maximal sum, which might increase the lower bound.

In accordance with at least some embodiments of the present disclosure, communication nodes 112 may be used as relays or intermediate communication nodes when they are free to do so. This smart, non-random relay selection which depends on the state of the switch (as described by the demand matrix 148) leads to excellent switching performance for nearly all traffic patterns and performs significantly better than VLB and RotorLB, which saturate the switch 104 with random selections of relay or intermediate communication nodes.

Figure 7:
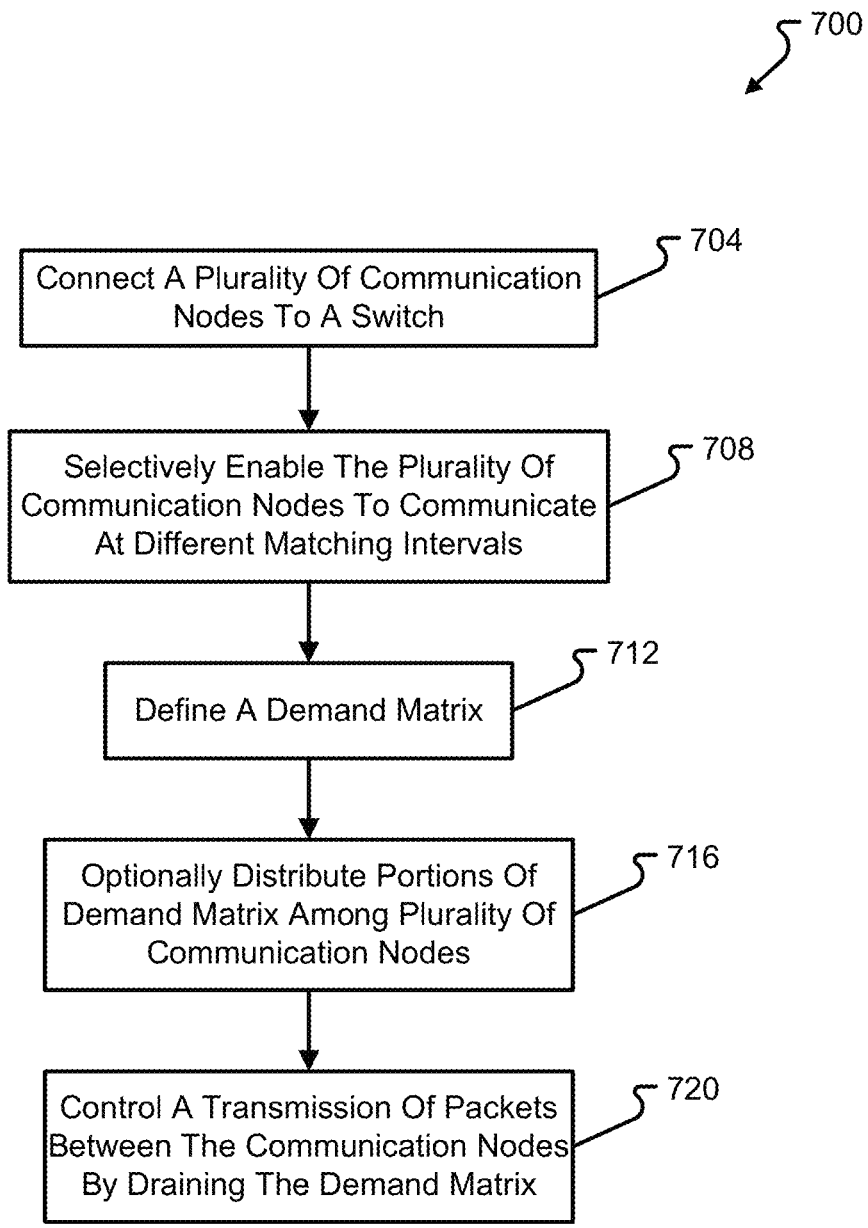
FIG. 7 is a flow diagram depicting a method of routing packets in accordance with at least some embodiments of the present disclosure.

Referring now to FIG. 7, an illustrative method 700 will be described in accordance with at least some embodiments of the present disclosure. The method 700 may be performed in a switch 104 by a processor 132 implementing a switching engine 144. Alternatively or additionally, the method 700 may be performed in one or multiple communication nodes 112 by a processor 132 implementing a switching engine 144. The order of operations depicted in FIG. 7 should not be construed as limiting embodiments of the present disclosure. For instance, certain steps may be performed in a different order without departing from the scope of the present disclosure. Furthermore, some steps may be performed in parallel (e.g., simultaneously) with one another.

The method 700 begins by connecting a plurality of communication nodes 112 to a switch 104 (step 704). The plurality of communication nodes 112 may be connected to the switch 104 via one or more ports 108 of the switch 104. In some embodiments, each communication node 112 may be connected to one port 108 of the switch 104 via a data uplink 120 and another port 108 of the switch 104 via a data downlink 124. In some embodiments, networking cables and/or pluggable network adapters may be used to connect the communication nodes 112 to one or more ports 108 of the switch 104. As can be appreciated, the nature of the switch 104 (e.g., whether the switch 104 is an optical switch or an electrical switch) may determine the type of networking cable that is used to connect the communication nodes 112 to the switch 104.

The method 700 may continue by selectively enabling the plurality of communication nodes 112 to communicate with one another at different matching intervals (step 708). For instance, the switch 104 may be configured to cycle through a set number of matchings 204 such that during a particular matching 204 (e.g., at a matching interval), pairs of communication nodes 112 may be connected to one another. At different matching intervals, different pairs of communication nodes 112 may be configured to communicate with one another because a different matching 204 may be implemented at the switch 104.

The method 700 may further include defining a demand matrix 148 (step 712). In some embodiments, demand matrix portions 152 may be defined/created at each communication node 112. In some embodiments, a demand matrix 148 may be maintained at the switch 104 to make centralized routing decisions. Thus, the method 700 may include an optional step of distributing or maintaining demand matrix portions 152 at the plurality of communication nodes 112 (step 716). As described above, the demand matrix 148 may include a row 404 and a column 408 for each communication node 112 connected with the switch 104. An intersection of a row 408 and column 408 may include a parameter value 412 at a matrix element, where the parameter value 412 identifies a number of packets to be routed from a source communication node 112 to a destination communication node 112.

The method 700 may continue by controlling a transmission of packets between the communication nodes 112 at each matching interval in such a way that the demand matrix 148 is drained (step 720). In some embodiments, the switching engine 144 that is making packet routing decisions may reference the demand matrix 148 or a demand matrix portion 152 to make a packet routing decision that attempts to drain the demand matrix 148 in a minimal number of matchings 204.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A switch, comprising:
   a plurality of ports, each port in the plurality of ports being configured to connect with a communication node among a plurality of communications nodes;
   switching hardware configured to selectively interconnect the plurality of ports thereby enabling communications between the plurality of ports; and
   a switching engine that controls a transmission of packets across the switching hardware by completely draining a demand matrix and reducing an upper bound of a number of matchings needed to completely drain the demand matrix while draining the demand matrix, wherein each matching in the demand matrix corresponds to a different pair of communication nodes that are connectable among the plurality of communication nodes, and wherein the switching engine reduces the upper bound by implementing an invest operation that includes:
      relieving a most loaded communication node from receiving an extra packet load while draining the demand matrix; and
      using a selected communication node as a relay node when the selected communication node has no packets of its own waiting to reach a destination communication node.

2. The switch of claim 1, wherein the demand matrix comprises a row and a column for each communication node connected to the plurality of ports, wherein a parameter value in the demand matrix identifies a number of packets to be routed from a source communication node to the destination communication node, and wherein the switching engine controls the transmission of the packets across the switching hardware by completely draining the demand matrix before constructing and draining another demand matrix.

3. The switch of claim 2, wherein the switching engine completely drains the demand matrix by first checking if direct transmission of a packet is possible from the source communication node to the destination communication node and if the direct transmission of the packet from the source communication node to the destination communication node is not possible, then checking the demand matrix to determine whether the packet should be routed through an intermediate communication node as the relay node instead of waiting for a later configuration of the switching hardware to occur.

4. The switch of claim 3, wherein the packet is routed through the intermediate communication node in response to determining that the intermediate communication node has fewer packets to transmit than the source communication node.

5. The switch of claim 3, wherein the intermediate communication node is selected based on an analysis of the demand matrix and after determining that the packet cannot be routed from the source communication node to the destination communication node with a current configuration of the switching hardware.

6. The switch of claim 1, wherein the switching engine drains the demand matrix by first attempting a direct transmission of a packet to a destination node and then attempting a multi-hop routing of the packet to the destination node in an event that direct transmission of the packet to the destination node is not available at a particular matching instance, and wherein the multi-hop routing is performed with reference to the demand matrix.

7. The switch of claim 1, wherein the switching hardware comprises optical communication components and wherein the packets are transmitted across the switching hardware using an optical signal.

8. The switch of claim 1, wherein the switching hardware is switchable between a limited number of matching configurations.

9. The switch of claim 1, wherein the switching hardware comprises electrical communication components and wherein the packets are transmitted across the switching hardware using an electrical signal.

10. The switch of claim 1, wherein the communication node comprises a Top of Rack (TOR) switch.

11. A communication system, comprising:
    a plurality of communication nodes; and
    a switch that interconnects and facilitates a transmission of packets between the plurality of communication nodes, wherein the packets are transmitted between the plurality of communication nodes by completely draining a demand matrix and reducing an upper bound of a number of matchings needed to completely drain the demand matrix while draining the demand matrix, wherein each matching in the demand matrix corresponds to a different pair of communication nodes that are connectable among the plurality of communication nodes, and wherein the switch reduces the upper bound by implementing an invest operation that includes:
       relieving a most loaded communication node from receiving an extra packet load while draining the demand matrix; and using a selected communication node as a relay node when the selected communication node has no packets of its own waiting to reach a destination communication node.

12. The communication system of claim 11, wherein:
the demand matrix comprises a row and a column for each communication node in the plurality of communication nodes;
a parameter value in the demand matrix identifies a number of packets to be routed from a source communication node to the destination communication node; and
the switch controls the transmission of the packets between the plurality of communication nodes.

13. The communication system of claim 12, wherein a possible number of matchings facilitated by the switch is fixed and wherein the switch comprises a switching engine that completely drains the demand matrix before constructing and draining another demand matrix.

14. The communication system of claim 12, wherein routing decisions for the packets are made by the plurality of communication nodes and wherein each of the plurality of communication nodes references a portion of the demand matrix when making a routing decision for a packet.

15. The communication system of claim 14, wherein the source communication node selects an intermediate communication node as the relay node to receive the packet with reference to the portion of the demand matrix and then transmits the packet to the destination communication node via the intermediate communication node.

16. The communication system of claim 11, wherein the switch comprises an optical switch.

17. The communication system of claim 11, wherein the switch comprises an electrical switch.

18. The communication system of claim 11, wherein the switch is configured to connect the plurality of communication nodes in pairs at each matching interval.

19. A method of routing packets, comprising:
connecting a plurality of communication nodes to a switch;
selectively enabling the plurality of communication nodes to communicate in pairs via the switch at different matching intervals;
defining a demand matrix; and
controlling a transmission of packets between the communication nodes by completely draining the demand matrix and reducing an upper bound of a number of matchings needed to completely drain the demand matrix while draining the demand matrix, wherein each matching in the demand matrix corresponds to a different pair of communication nodes that are connectable among the plurality of communication nodes, and wherein the switch reduces the upper bound by implementing an invest operation that includes:
relieving a most loaded communication node from receiving an extra packet load while draining the demand matrix; and
using a selected communication node as a relay node when the selected communication node has no packets of its own waiting to reach a destination communication node.

20. The method of claim 19, wherein the demand matrix comprises a row and a column for each communication node in the plurality of communication nodes, and wherein a parameter value in the demand matrix identifies a number of packets to be routed from a source communication node to the destination communication node.

21. The method of claim 20, wherein the switch controls the transmission of the packets by completely draining the demand matrix before constructing and draining another demand matrix.

22. The method of claim 20, wherein the plurality of communication nodes control the transmission of the packets by completely draining the demand matrix before constructing and draining another demand matrix.

* * * * *